US010252332B2

(12) United States Patent
Schwarze

(10) Patent No.: US 10,252,332 B2
(45) Date of Patent: Apr. 9, 2019

(54) POWDER PROCESSING ARRANGEMENT AND METHOD FOR USE IN AN APPARATUS FOR PRODUCING THREE-DIMENSIONAL WORK PIECES

(71) Applicant: SLM Solutions GmbH, Luebeck (DE)

(72) Inventor: Dieter Schwarze, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 231 days.

(21) Appl. No.: 14/511,675

(22) Filed: Oct. 10, 2014

(65) Prior Publication Data
US 2016/0228949 A1 Aug. 11, 2016

(30) Foreign Application Priority Data

Oct. 10, 2013 (EP) .................................... 13188055

(51) Int. Cl.
B22F 3/105 (2006.01)
B22F 1/00 (2006.01)
(Continued)

(52) U.S. Cl.
CPC .......... B22F 1/0085 (2013.01); B22F 3/1055 (2013.01); B29C 64/20 (2017.08);
(Continued)

(58) Field of Classification Search
CPC ........................... B22F 3/1055; B29C 67/0085
See application file for complete search history.

(56) References Cited

U.S. PATENT DOCUMENTS 5,252,264 A * 10/1993 Forderhase ............. B22F 3/004
156/272.8
2005/0242473 A1* 11/2005 Newell ............... B29C 67/0077
264/497
2006/0119012 A1 6/2006 Ruatta et al.

FOREIGN PATENT DOCUMENTS

EP  1793979 B1  2/2009
EP  2191922 B1  1/2011
(Continued)

OTHER PUBLICATIONS

Extended European Search Report, EP 13188055.1, SLM Solutions GmbH, dated Mar. 18, 2014.
(Continued)

Primary Examiner — Christopher S Kessler
(74) Attorney, Agent, or Firm — Taft Stettinius & Hollister LLP

(57) ABSTRACT

A powder processing arrangement (10) for use in an apparatus (100) for producing three-dimensional work pieces by selectively irradiating a raw material powder with electromagnetic or particle radiation comprises a carrier element (16) having a build section (46) adapted to carry a raw material powder layer while being selectively irradiated with electromagnetic or particle radiation and at least one transfer section (48a, 48b) adapted to carry the raw material powder prior to being applied to the build section (46) so as to form the raw material powder layer to be selectively irradiated with electromagnetic or particle radiation. The powder processing arrangement (10) further comprises a heating device (50) adapted to pre-heat the raw material powder carried by the transfer section (48a, 48b) of the carrier element (16) prior to being applied to the build section (46) of the carrier element (16) so as to form the raw material powder layer to be selectively irradiated with electromagnetic or particle radiation.

15 Claims, 3 Drawing Sheets

(51) Int. Cl.
   *B33Y 30/00* (2015.01)
   *B29C 64/20* (2017.01)
   *B33Y 10/00* (2015.01)
   *B29C 64/153* (2017.01)
(52) U.S. Cl.
   CPC ....... *B33Y 30/00* (2014.12); *B22F 2003/1056* (2013.01); *B29C 64/153* (2017.08); *B33Y 10/00* (2014.12); *Y02P 10/295* (2015.11)

(56) References Cited

FOREIGN PATENT DOCUMENTS

| JP | 2008037024 A | 2/2008 |
| WO | 96/29192 A1 | 9/1996 |
| WO | 9629192 A1 | 9/2006 |

OTHER PUBLICATIONS

Notification of Reasons for Refusal, JP2014-207697, dated Aug. 23, 2016, partial translation attached, 9 pages.

\* cited by examiner

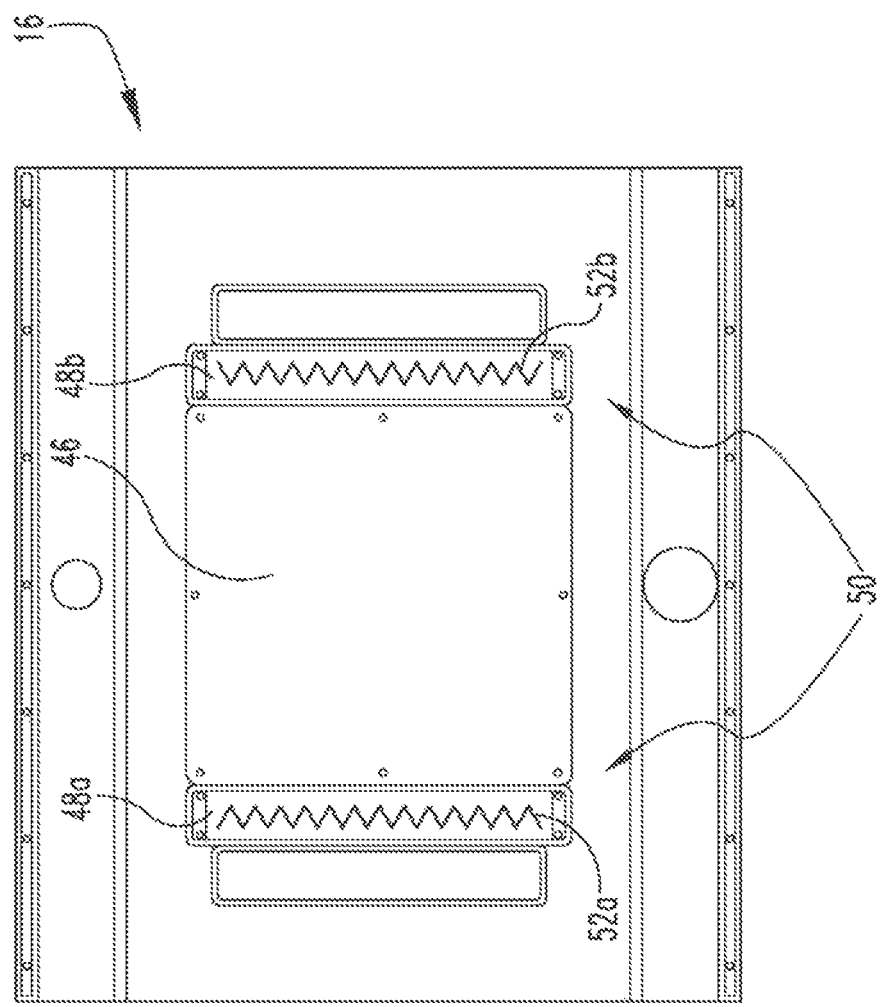

POWDER PROCESSING ARRANGEMENT AND METHOD FOR USE IN AN APPARATUS FOR PRODUCING THREE-DIMENSIONAL WORK PIECES

FIELD OF THE INVENTION

The invention relates to a powder processing arrangement for use in an apparatus for producing three-dimensional work pieces by selectively irradiating a raw material powder with electromagnetic or particle radiation. Further, the invention concerns an apparatus for producing three-dimensional work pieces by selectively irradiating layers of a raw material powder with electromagnetic or particle radiation, the apparatus comprising a powder processing arrangement of this kind. Finally, the invention is directed to a method of processing raw material powder in an apparatus for producing three-dimensional work pieces by selectively irradiating the raw material powder with electromagnetic or particle radiation.

BACKGROUND

Selective laser melting or laser sintering is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes, tools, replacement parts or medical prostheses, such as, for example, dental or orthopaedic prostheses, on the basis of CAD data.

An apparatus for producing moulded bodies from pulverulent raw materials by selective laser melting is described, for example, in EP 1 793 979 B1. The prior art apparatus comprises a process chamber which accommodates a plurality of carriers for the shaped bodies to be manufactured. A powder layer preparation system comprises a powder reservoir holder that can be moved to and fro across the carriers in order to apply a raw material powder to be irradiated with a laser beam onto the carriers. Heating means may be provided for heating the powder to be processed by selective laser melting.

EP 2 191 922 B1 describes a carrier and powder application apparatus for use in a plant for manufacturing work pieces by impinging powder layers with electromagnetic radiation or particle radiation, wherein at least one leveling slider is positionable relative to a powder outlet opening of a powder chamber between an idle position and an operating position such that it is not in contact with a raw material powder layer applied onto the carrier via the powder outlet opening in its idle position and such that it sweeps across the raw material powder layer applied onto the carrier via the powder outlet opening in its operating position in order to level the raw material powder layer during operation of the powder application device, when the powder application device is moved across the carrier.

SUMMARY

The invention is directed at the object of providing a powder processing arrangement for use in an apparatus which allows the production of high-quality three-dimensional work pieces by selectively irradiating layers of a raw material powder with electromagnetic or particle radiation. Further, the invention is directed at the object of providing an apparatus for producing three-dimensional work pieces by selectively irradiating a raw material powder with electromagnetic or particle radiation which comprises a powder processing arrangement of this kind. Finally, the invention is directed at the object of providing a method of processing raw material powder in an apparatus for producing of high-quality three-dimensional work pieces by selectively irradiating the raw material powder with electromagnetic or particle radiation.

This object is addressed by a powder processing arrangement as defined in claim 1, an apparatus as defined in claim 10 and a method as defined in claim 11.

A powder processing arrangement according to the invention for use in an apparatus for producing three-dimensional work pieces by selectively irradiating a raw material powder with electromagnetic or particle radiation comprises a carrier element having a build section adapted to carry a raw material powder layer while being selectively irradiated with electromagnetic or particle radiation. The build section of the carrier element thus serves to carry both, raw material powder layers which are successively applied to the build section and the work piece which is built up in layers from the raw material powder by selectively irradiating the raw material powder layers with electromagnetic or particle radiation. Further, the carrier element comprises at least one transfer section adapted to carry the raw material powder prior to being applied to the build section so as to form the raw material powder layer to be selectively irradiated with electromagnetic or particle radiation. The transfer section of the carrier element thus serves as a kind of temporary storage for the raw material powder before the raw material powder is applied to the build section of the carrier element so as to form a raw material powder layer for being selectively irradiated with electromagnetic or particle radiation.

The carrier element as a whole may be a rigidly fixed carrier element or may be designed to be displaceable in vertical direction so that, with increasing construction height of a work piece, as it is built up in layers from the raw material powder on the build section of the carrier element, the carrier element can be moved downwards in the vertical direction. It is, however, also conceivable that the transfer section of the carrier element is rigidly fixed, whereas the build section of the carrier element is designed to be displaceable in vertical direction relative to the transfer section so that, with increasing construction height of a work piece, as it is built up in layers from the raw material powder on the build section of the carrier element, the build section can be moved downwards in the vertical direction relative to the transfer section. The raw material powder preferably is a metallic powder, in particular a metal alloy powder, but may also be a ceramic powder or a powder containing different materials. The powder may have any suitable particle size or particle size distribution. It is, however, preferable to process powders of particle sizes <100 µm.

The powder processing arrangement further comprises a heating device which is adapted to pre-heat the raw material powder carried by the transfer section of the carrier element prior to being applied to the build section of the carrier element so as to form the raw material powder layer to be selectively irradiated with electromagnetic or particle radiation. By pre-heating the raw material powder, temperature gradients resulting from a difference between the temperature of raw material powder particles that are actually irradiated with electromagnetic or particle radiation and hence melted and/or sintered and the temperature of raw material powder particles arranged outside of an irradiation zone as well as the temperature of already generated layers of the work piece built up in layers from the raw material powder can be diminished. As a result, thermal stresses within the work piece can be reduced.

In the powder processing arrangement according to the invention, the heating device provides for a pre-heating of the raw material powder already before the raw material powder is actually applied to the build section of the carrier element. The heating of the raw material powder thus is not influenced by the irradiation process or the increase in the amount of raw material powder and in particular the increase in the height of the "stack" of raw material powder layers present on the build section of the carrier element with increasing construction height of the work piece, as it is built up in layers from the raw material powder. Instead, in the powder processing arrangement, each layer of raw material powder applied to the build section of the carrier element is uniformly pre-heated to a desired pre-heating temperature before it is actually transferred to the build section for being irradiated with electromagnetic or particle radiation. Temperature gradients resulting from the difference between the temperature of raw material powder particles that are actually irradiated with electromagnetic or particle radiation and the temperature of raw material powder particles arranged outside of the irradiation zone as well as the temperature of already generated layers of the work piece thus can be minimized allowing thermal stresses within the work piece to be also minimized. Consequently, a crack-free high-strength and high-quality work piece can be obtained.

The heating device may be of any suitable design which allows a pre-heating of the raw material powder carried by the transfer section of the carrier element. In particular, the heating device may comprise a heating element which is adapted to pre-heat the raw material powder applied to the transfer section of the carrier element by resistance heating, by inductive heating or by dielectric heating using microwaves. In a preferred embodiment of the powder processing arrangement, the heating device comprises a heating element that is integrated into the carrier element in the region of the transfer section of the carrier element. A heating device of this design is easy to implement in an apparatus for producing three-dimensional work pieces by irradiating a raw material powder with electromagnetic or particle radiation and allows a locally restricted pre-heating of the raw material powder carried by the transfer section of the carrier element.

The powder processing arrangement may further comprise a powder application device which is adapted to apply the raw material powder to the transfer section of the carrier element. Specifically, the powder application device may comprise at least one powder storage for storing the raw material powder to be applied to the carrier element, and a powder channel connecting the powder storage to a powder outlet opening of the powder application device. The raw material powder accommodated within the powder storage of the powder application device thus, via the powder channel, may be conveyed to the powder outlet opening, wherein, if desired, a suitable conveying device may be provided in the powder application device for conveying the raw material powder from the powder storage to a powder outlet opening. The size and the shape of the powder outlet opening of the powder application device may be adapted to the size and the shape of the transfer section of the carrier element, thus allowing raw material powder applied to the transfer section by means of the powder application device to be uniformly distributed across a surface of the transfer section. By uniformly distributing the raw material powder across a surface of the transfer section, a particularly uniform pre-heating of the raw material powder can be achieved.

The powder application device may be provided with a dosing system which allows raw material powder to be applied to the transfer section in an amount which corresponds to the amount of raw material powder which is necessary to form a raw material powder layer to be selectively irradiated with electromagnetic or particle radiation on the build section of the carrier element. In case raw material powder is applied to the transfer section of the carrier element in an amount which corresponds to the amount of raw material powder which is necessary to form a single raw material powder layer on the build section of the carrier, the amount of raw material powder applied to the transfer section is minimized allowing a particular efficient and uniform pre-heating of the raw material powder.

The dosing system may be configured to control the discharge of raw material powder from a powder storage of the powder application device in such a manner that the amount of raw material powder applied to the transfer section corresponds to the amount of raw material powder which is necessary to form a raw material powder layer to be selectively irradiated with electromagnetic or particle radiation on the build section of the carrier element. Alternatively or additionally thereto the dosing system may be configured to control the supply of raw material powder into a powder storage of the powder application device in such a manner that the amount of raw material powder supplied to powder storage of the powder application device corresponds to the amount of raw material powder which is necessary to form a raw material powder layer to be selectively irradiated with electromagnetic or particle radiation on the build section of the carrier element. In the latter case, the raw material powder can simply be discharged onto the transfer section of the carrier element, for example by opening a closure element suitable for opening and closing a powder outlet opening of the powder application device, while still ensuring that the amount of raw material powder applied to the transfer section corresponds to the amount of raw material powder which is necessary to form a raw material powder layer to be selectively irradiated with electromagnetic or particle radiation on the build section of the carrier element.

The powder application device may be movable across the carrier element. For example, the powder application device may be movable across the carrier element by means of a suitable drive mechanism comprising a drive motor and a gear unit connecting the powder application device to the drive motor. The powder application device may be movable to and fro across the carrier element, i.e. the powder application device may be movable across the carrier element in two opposing directions. Further, the powder application device may be provided with a suitable means, such as, for example, a slider which allows raw material powder carried by the transfer section of the carrier element to be transferred to the build section of the carrier element and to be distributed across the build section so as to form the raw material powder layer to be selectively irradiated with electromagnetic or particle radiation on the build section by moving the powder application device across the carrier element. The powder application device then may fulfill the double-function to apply the raw material powder to the transfer section and to also form the raw material powder layer to be selectively irradiated with electromagnetic or particle radiation on the build section of the carrier element.

Preferably, the powder application device is provided with a slider which, when viewed in a direction of movement of the powder application device across the carrier element, is disposed behind a powder outlet opening of the powder application device. This design of the powder application device allows raw material powder applied to the transfer section of the carrier element via the powder outlet opening to be distributed across the build section of the carrier element by means of the slider which sweeps over the raw material powder when the powder application device is moved across the carrier element.

The powder processing arrangement may further comprise a control unit which is adapted to control the operation of the powder application device in such a manner that the raw material powder carried by the transfer section of the carrier element is transferred to the build section of the carrier element and distributed on the build section so as to form the raw material powder layer to be selectively irradiated with electromagnetic or particle radiation on the build section only after the raw material powder, while being carried by the transfer section, has been pre-heated by the heating device. The control unit thus ensures that a powder application device which fulfills the double-function to apply raw material powder to the transfer section of the carrier element and also to distribute the raw material powder across the build section of the carrier element so as to form the raw material powder layer to be selectively irradiated with electromagnetic or particle radiation transfers the raw material powder from the transfer section to the build section of the carrier element only after the raw material powder has been sufficiently pre-heated to a desired pre-heating temperature by means of the heating device.

In a preferred embodiment of the powder processing arrangement, the at least one transfer section is arranged adjacent to an edge of the build section. For example, the build section may have a square or rectangular shape and the transfer section may have the shape of a stripe which is arranged adjacent to an edge of the build section and which preferably extends substantially perpendicular to a direction of movement of the powder application device across the carrier element. A powder application device having a powder outlet opening the size and shape of which is adapted to the size and shape of the transfer section then may easily apply the raw material powder to the transfer section and, after the raw material powder has been sufficiently pre-heated by means of the heating device, may transfer the raw material powder to the build section upon moving across the carrier element. The transfer section may extend along the entire length of the edge of the build section. The build section then may be uniformly covered with raw material powder deposited onto the transfer section for pre-heating by the slider of the powder application device when the powder application device is moved across the carrier element.

The carrier element of the powder processing arrangement may comprise only one transfer section. Preferably, however, the carrier element of the powder processing arrangement comprises a first transfer section and a second transfer section. The first transfer section may be arranged adjacent to a first edge of the build section and the second transfer section may be arranged adjacent to a second edge of the build section, wherein the first and the second edge of the build section preferably extend substantially parallel to each other and preferably also substantially perpendicular to a direction of movement of the powder application device across the carrier element. When the carrier element of the powder processing arrangement is provided with two transfer sections arranged adjacent two parallel edges of the build section, the powder application device may be moved across the carrier element so as to alternately transfer raw material powder from the first and the second transfer section to the build section of the carrier element. This allows an operation of the powder application device without "blank runs".

In particular in case the carrier element of the powder processing arrangement is provided with two transfer sections, the powder application device may comprise only one powder outlet opening, but two sliders allowing the powder application device to generate a raw material powder layer on the build section of the carrier element independent of whether the powder application device is moved to or fro across the carrier element. In this case, the slider, however, should be movable between an idle position and an operating position as described, for example, in EP 2 191 922 B1. Alternatively thereto, the powder application device may also comprise two powder outlet openings and only one slider which is arranged between the two powder outlet openings. Raw material powder then may be discharged from a powder outlet opening which is selected in dependence on the direction of movement of the powder application device across the carrier element in such a manner that the slider, when viewed in the direction of movement of the powder application device across the carrier element, is disposed behind the powder outlet opening which is used to discharge the raw material powder. As a further alternative, the powder application device may be provided with a movable slider which may be positioned relative to the powder outlet opening as needed so as to be disposed, when viewed in the direction of movement of the powder application device across the carrier element, behind the powder outlet opening.

The control unit may be adapted to control the operation of the powder application device in such a manner that raw material powder is applied to the first transfer section of the carrier element and left on the first transfer section of the carrier element while a raw material powder layer formed on the build section of the carrier element by transferring raw material powder to the build section from the second transfer section is selectively irradiated with electromagnetic or particle radiation. Hence, the time period during which the raw material powder layer generated from raw material powder transferred to the build section from the second transfer section is selectively irradiated with electromagnetic or particle radiation is utilized for applying further raw material powder to the first transfer section and for pre-heating the further raw material powder carried by the first transfer section.

Alternatively or additionally thereto, the control unit may be adapted to control the operation of the powder application device in such a manner that raw material powder is applied to the second transfer section of the carrier element and left on the second transfer section of the carrier element while a raw material powder layer formed on the build section of the carrier element by transferring raw material powder to the build section from the first transfer section is selectively irradiated with electromagnetic or particle radiation. The time needed for irradiating the raw material powder layer on the build section which is formed from powder pre-heated while being carried on the first transfer section thus is utilized by the powder application device for applying additional raw material powder to the second transfer section and for pre-heating the additional raw material powder while being carried by the second transfer section.

In case the control unit is adapted to control the operation of the powder application device in such a manner that raw material powder is applied to the first transfer section of the carrier element and left on the first transfer section of the carrier element while a raw material powder layer formed on the build section of the carrier element by transferring raw material powder to the build section from the second transfer section is selectively irradiated with electromagnetic or particle radiation and in such a manner that raw material powder is applied to the second transfer section of the carrier element and left on the second transfer section of the carrier element while a raw material powder layer formed on the build section of the carrier element by transferring raw material powder to the build section from the first transfer section is selectively irradiated with electromagnetic or particle radiation, the powder application device may be moved to and fro across the carrier element while continuously transferring raw material powder to the build section of the carrier element from either the first or the second transfer section. Thus, the powder application device can be operated without "blank runs" allowing a particularly efficient operation of the powder processing arrangement.

An apparatus, according to the invention, for producing three-dimensional work pieces by irradiating a raw material powder with electromagnetic or particle radiation comprises a powder processing arrangement as described above.

The powder processing arrangement may be accommodated within a process chamber. The process chamber may be sealable against the ambient atmosphere, i.e. against the environment surrounding the process chamber, in order to be able to maintain a controlled atmosphere, in particular an inert atmosphere within the process chamber. By controlling the atmosphere within the process chamber, the occurrence of undesired chemical reactions, in particular oxidation reactions, upon irradiating the raw material powder with electromagnetic or particle radiation can be prevented. The gas supplied to the process chamber preferably is an inert gas such as, for example, Argon, Nitrogen or the like. It is however also conceivable to supply the process chamber with air. The gas may be supplied to the process chamber by means of a suitable conveying device such as, for example, a pump.

The apparatus may further comprise an irradiation device for selectively irradiating the raw material powder layers applied to the build section of the carrier with electromagnetic or particle radiation. The irradiation device preferably is adapted to irradiate radiation to the raw material powder which causes a site-selective melting of the raw material powder particles. The irradiation device may comprise at least one radiation source, in particular a laser source, and at least one optical unit for guiding and/or processing a radiation beam emitted by the radiation source. The optical unit may comprise optical elements such an object lens, in particular and f-theta lens, and a scanner unit, the scanner unit preferably comprising a diffractive optical element and a deflection mirror.

A method, according to the invention, of processing raw material powder in an apparatus for producing three-dimensional work pieces by selectively irradiating the raw material powder with electromagnetic or particle radiation comprises the step of applying raw material powder to at least one transfer section of a carrier element. The raw material powder is transferred from the at least one transfer section of the carrier element to a build section of the carrier element. A raw material powder layer to be selectively irradiated with electromagnetic or particle radiation is formed on the build section of the carrier element. The raw material powder carried by the transfer section of the carrier element is pre-heated prior to being applied to the build section of the carrier element so as to form the raw material powder layer to be selectively irradiated with electromagnetic or particle radiation.

The raw material powder is applied to the transfer section of the carrier element by means of a powder application device. Preferably, the raw material powder is applied to the transfer section of the carrier element in an amount which corresponds to the amount of raw material powder which is necessary to form a raw material powder layer to be selectively irradiated with electromagnetic or particle radiation on the build section of the carrier element.

The powder application device may be moved across the carrier element. Further, the powder application device may be provided with suitable means such as a slider which allows raw material powder carried by the transfer section of the carrier element to be transferred to the build section of the carrier element and to be distributed on the build section so as to form the raw material powder layer to be selectively irradiated with electromagnetic or particle radiation on the build section by moving the powder application device across the carrier element.

The operation of the powder application device may be controlled in such a manner that the raw material powder carried by the transfer section of the carrier element is transferred to the build section of the carrier element and distributed on the build section so as to form the raw material powder layer to be selectively irradiated with electromagnetic or particle radiation on the build section only after the raw material powder, while being carried by the transfer section, has been pre-heated by the heating device.

At least one transfer section may be arranged adjacent to an edge of the build section. The at least one transfer section may extend along the entire length of the edge of the build section. Alternatively or additionally thereto, the carrier element may comprise a first transfer section and a second transfer section, the first transfer section being arranged adjacent to a first edge of the build section and a second transfer section being arranged adjacent to a second edge of the build section. The first and the second edge of the build section preferably extend substantially parallel to each other.

The operation of the powder application device may be controlled in such a manner that raw material powder is applied to the first transfer section of the carrier element and left on the first transfer section of the carrier element while a raw material powder layer formed on the build section of the carrier element by transferring raw material powder to the build section from the second transfer section is selectively irradiated with electromagnetic or particle radiation. Additionally or alternatively thereto, the operation of the powder application device may be controlled in such a manner that raw material powder is applied to the second transfer section of the carrier element and left on the second transfer section of the carrier element while a raw material powder layer formed on the build section of the carrier element by transferring raw material powder to the build section from the first transfer section is selectively irradiated with electromagnetic or particle radiation.

BRIEF DESCRIPTION OF THE DRAWINGS

Preferred embodiments of the invention in the following are explained in greater detail with reference to the accompanying schematic drawings, in which:

FIG. 2 shows a top view of a carrier element of the powder processing arrangement employed in the apparatus according to FIG. 1, and FIGS. 3A-3C illustrate a method of processing raw material powder in the apparatus according to FIG. 1.

DETAILED DESCRIPTION

Figure 1:
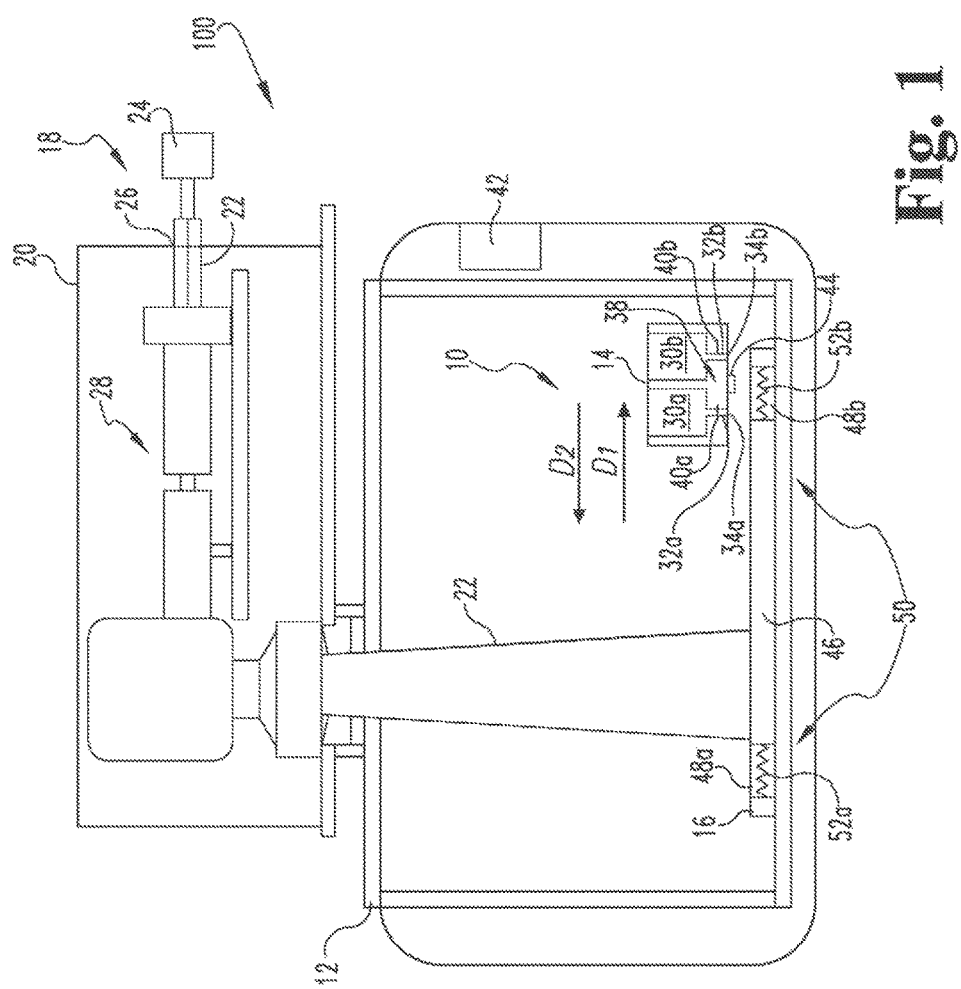
FIG. 1 shows an apparatus for producing three-dimensional work pieces which is equipped with a powder processing arrangement.

FIG. 1 shows an apparatus 100 for producing three-dimensional work pieces by selective laser melting (SLM®). The apparatus 100 comprises a powder processing arrangement 10 which is arranged within a process chamber 12 of the apparatus 100. The process chamber 12 is sealable against the ambient atmosphere, i.e. against the environment surrounding the process chamber 12. The powder processing arrangement 10, which will be described in greater detail below, comprises a powder application device 14 which serves to apply a raw material powder to a carrier element 16. The raw material powder may be a metallic powder, in particular a metal alloy powder, but may also be a ceramic powder or a powder containing different materials.

The apparatus 10 further comprises an irradiation device 18 for selectively irradiating laser radiation to the raw material powder applied to the carrier element 16. By means of the irradiation device 18, the raw material powder applied to the carrier element 16 may be subjected to laser radiation in a site-selective manner in dependence on the desired geometry of the work piece that is to be produced. The irradiation device 18 has a hermetically sealable housing 20. A radiation beam 22, in particular a laser beam, provided by a radiation source 24, in particular a laser source which may, for example, comprise a diode pumped Ytterbium fibre laser emitting laser light at a wavelength of approximately 1070 to 1080 nm is directed into the housing 20 via an opening 26.

The irradiation device 18 further comprises an optical unit 28 for guiding and processing the radiation beam 22. The optical unit 28 may comprise a beam expander 30 for expanding the radiation beam 22, a scanner and an object lens. Alternatively, the optical unit 28 may comprise a beam expander including a focusing optic and a scanner unit. By means of the scanner unit, the position of the focus of the radiation beam 22 both in the direction of the beam path and in a plane perpendicular to the beam path can be changed and adapted. The scanner unit may be designed in the form of a galvanometer scanner and the object lens may be an f-theta object lens.

The powder application device 14 of the powder processing arrangement 10 comprises a first and a second powder storage 30a, 30b for storing the raw material powder to be applied to the carrier element 16. A first powder channel 32a connects the first powder storage 30a to a first powder outlet opening 34a and a second powder channel 32b connects the second powder storage 30b to a second powder outlet opening 34b. Further, the powder application device 14 is provided with a dosing system 38 which allows raw material powder to be applied to the carrier element 16 in a desired amount.

The dosing system 38 comprises a first closure element 40a which is movable between a closed position and an open position. In its closed position, the first closure element 40a closes the first powder channel 32a of the powder application device 14 and hence prevents raw material powder accommodated within the first powder storage 30a to be discharged from the first powder storage 30a via the first powder outlet opening 34a. To the contrary, in its open position, the first closure element 40a opens the first powder channel 32a of the powder application device 14 and hence allows the discharge of raw material powder accommodated within the first powder storage 30a from the first powder storage 30a via the first powder outlet opening 34a. Further, the dosing system 38 comprises a second closure element 40b which is movable between a closed position and an open position. In its closed position, the second closure element 40b closes the second powder channel 32b of the powder application device 14 and hence prevents raw material powder accommodated within the second powder storage 30b to be discharged from the second powder storage 30b via the second powder outlet opening 34b. To the contrary, in its open position, the second closure element 40b opens the second powder channel 32b of the powder application device 14 and hence allows the discharge of raw material powder accommodated within the second powder storage 30b from the second powder storage 30b via the second powder outlet opening 34b.

The powder application device 14 is movable to and fro in opposing directions D1 and D2 across the carrier element 16. A control unit 42 serves to control the operation of the powder application device 14. In particular, the control unit 42 is adapted to control the movement of the powder application device 14 across the carrier element 16 and the discharge of raw material powder from the powder storage 30 of the powder application device 14. Finally, the powder application device 14 is provided with a slider 44 which is arranged between the first and the second powder outlet opening 34a, 34b and which serves to sweep over raw material powder discharged from either the first or the second powder outlet opening 34a, 34b so as to displace and level the raw material powder.

Since the slider 44 is arranged between the first and the second powder outlet opening 34a, 34b, the slider 44, when viewed in the direction of movement of the powder application device 14 across the carrier element 16, always is disposed behind one of the powder outlet openings 34a, 34b. Specifically, in case the powder application device 14 is moved across the carrier element 16 in the direction D1, the slider 44, when viewed in the direction of movement of the powder application device 14 across the carrier element 16, is disposed behind the second powder outlet opening 34b and hence may be used to displace and level raw material powder discharged via the second powder outlet opening 34b. To the contrary, in case the powder application device 14 is moved across the carrier element 16 in the direction D2, the slider 44, when viewed in the direction of movement of the powder application device 14 across the carrier element 16, is disposed behind the first powder outlet opening 34a and hence may be used to displace and level raw material powder discharged via the second powder outlet opening 34a.

The carrier element 16 of the powder processing arrangement 10, which is depicted in greater detail in FIG. 2, comprises a build section 46 which has the shape of a square and is arranged in a central region of the carrier element 16. The build section 46 serves to carry a raw material powder layer while being selectively irradiated with electromagnetic or particle radiation. Further, a work piece which is built up in layers from the raw material powder by selectively irradiating the raw material powder layers with electromagnetic or particle radiation is generated on the build section 46 of the carrier element 16. The carrier element 16 further comprises a first and a second transfer section 48a, 48b. Raw material powder to be irradiated with electromagnetic or particle radiation, in the powder processing arrangement 10, is not directly applied to the build section 46 of the carrier element 16, but to one of the first and a second transfer section 48a, 48b. Hence, each transfer section 48a, 48b serves to carry the raw material powder prior to being applied to the build section 30 thus forming a kind of temporary storage for the raw material powder before the raw material powder is transferred to the build section 46 so as to be selectively irradiated with electromagnetic or particle radiation. The build section 46 of the carrier element 16 is designed to be displaceable in vertical direction relative to the transfer sections 48a, 48b so that, with increasing construction height of a work piece, as it is built up in layers from the raw material powder on the build section 46 of the carrier element 16, the build section 46 can be moved downwards in the vertical direction relative to the transfer sections 48a, 48b.

The size and the shape of the powder outlet openings 34a, 34b of the powder application device 14 are adapted to the size and the shape of the transfer sections 48a, 48b of the carrier element 16. In particular, the size and the shape of a flow cross section of the powder outlet openings 34a, 34b substantially correspond to the size and the shape of a surface of the transfer sections 48a, 48b, thus allowing raw material powder applied to the transfer sections 48a, 48b by means of the powder application device 14 to be uniformly distributed across a surface of the transfer sections 48a, 48b. The slider 44 of the powder application device 14 extends along substantially the entire length of the powder outlet openings 34a, 34b, thus being adapted to sweep over substantially the entire surface of the transfer sections 48a, 48b when the powder application device 14 is moved across the carrier element 16.

The first substantially stripe-shaped transfer section 48a is arranged adjacent to a first edge of the build section 46 and the second substantially stripe-shaped transfer section 48b is arranged adjacent to a second edge of the build section 46, wherein the first and the second edge of the build section 46 and hence the first and the second transfer section 48a, 48b extend substantially parallel to each other and substantially perpendicular to the directions of movement D1, D2 of the powder application device 14 across the carrier element 16. Further, the first transfer section 48a extends along the entire length of the first edge of the build section 46, while the second transfer section 48b extends along the entire length of the second edge of the build section 46. As a result, the build section 46 may be uniformly covered with raw material powder temporarily deposited on the first or the second transfer section 48a, 48b when the powder application device 14 is moved across the carrier element 16 and hence the slider 44 of the powder application device 14 sweeps over the raw material powder applied to the first or the second transfer section 48a, 48b so as to transfer the raw material powder to the build section 46.

The powder processing arrangement 10 further comprises a heating device 50 which is adapted to pre-heat the raw material powder carried by the transfer sections 48a, 48b of the carrier element 16 prior to being applied to the build section 46 of the carrier element 16 so as to form the raw material powder layer to be selectively irradiated with electromagnetic or particle radiation. The heating device 50 comprises a first and a second heating element 52a, 52b which are integrated into the carrier element 16 in the region of the transfer sections 48a, 48b of the carrier element 16. In the powder processing arrangement 10, the heating device 50 provides for a pre-heating of the raw material powder already before the raw material powder is actually applied to the build section 46 of the carrier element 16. The pre-heating of the raw material powder thus is not influenced by the irradiation process or the increase in the amount of raw material powder and in particular the increase in the height of the "stack" of raw material powder layers present on the build section 46 of the carrier element 16 with increasing construction height of the work piece, as it is built up in layers from the raw material powder. Instead, each layer of raw material powder applied to the build section 46 of the carrier element 16 is uniformly pre-heated to a desired pre-heating temperature before it is actually transferred to the build section 46 for being irradiated with electromagnetic or particle radiation. Temperature gradients resulting from the difference between the temperature of raw material powder particles that are actually irradiated with electromagnetic or particle radiation and the temperature of raw material powder particles arranged outside of the irradiation zone as well as the temperature of already generated layers of the work piece thus can be minimized allowing thermal stresses within the work piece to be also minimized. Consequently, a crack-free high-strength and high-quality work piece can be obtained.

Figure 3A:
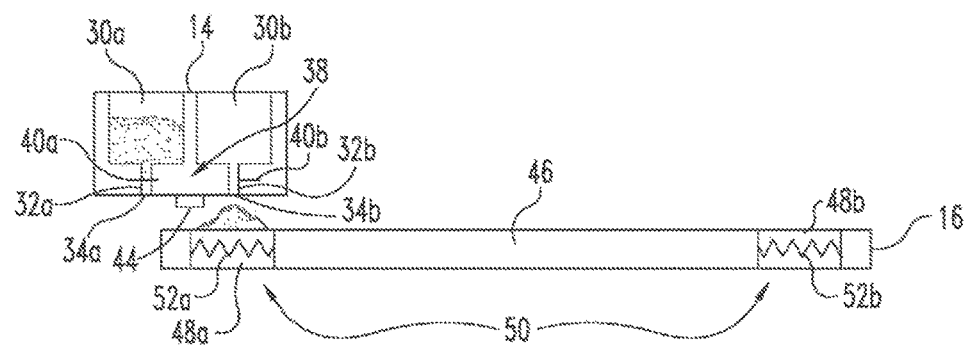

The operation of the apparatus 100 and in particular the operation of the powder processing apparatus 10 now will be described in greater detail with reference to FIG. 3. As depicted in FIG. 3a, upon start-up of the apparatus 100, in a first step, raw material powder is applied to the first transfer section 48a of the carrier element 16 by means of the powder application device 14. In particular, raw material powder is discharged from the second powder storage 30b of the powder application device 14 via the second powder channel 32b and the second powder outlet opening 34b. Operation of the second closure element 40b, by the control unit 42, is controlled such that raw material powder is applied from the second powder storage 30b to the first transfer section 48a in an amount which corresponds to the amount of raw material powder which is necessary to form a raw material powder layer to be selectively irradiated with electromagnetic or particle radiation on the build section 46 of the carrier element 16. Hence, the amount of raw material powder applied to the first transfer section 48a is minimized allowing a particular efficient and uniform pre-heating of the raw material powder.

While being carried on the first transfer section 48a, the raw material powder is pre-heated by means of the heat generated by the first heating element 52a of the heating device 50. The temperature to which the raw material powder is pre-heated by means of the first heating element 52a of the heating device 50 may be selected in dependence on the type and in particular in dependence on the melting point and the sintering characteristic of the raw material powder. In any case, the control unit 42 controls the operation of the powder application device 16 in such a manner that the raw material powder carried by the first transfer section 46a of the carrier element 16 is left on the first transfer section 46a until the raw material powder is pre-heated to a desired temperature. During pre-heating of the raw material powder the powder application device 16 remains in place.

When the raw material powder carried by the first transfer section 48a has reached the desired pre-heating temperature, the powder application device 16 is moved across the carrier element 16 in the direction D1. As a result, the slider 44 of the powder application device 16 sweeps over the raw material powder on the first transfer section 48a and transfers the raw material powder to the build section 46 of the carrier element 16. In particular, the slider 44, using the pre-heated raw material powder from the first transfer section 48a, forms a raw material powder layer 54 on the build section 46 of the carrier element 16 which is suitable for being selectively irradiated with electromagnetic or particle radiation. The powder application device 16 thus fulfills the double-function to apply raw material powder to the first transfer section 48a of the carrier element 16 and also to distribute the raw material powder across the build section 46 of the carrier element 16 so as to form the raw material powder layer 54 to be selectively irradiated with electromagnetic or particle radiation. The control unit 42, however, controls the operation of the powder application device 16 in such a manner that the powder application device 16 transfers the raw material powder from the first transfer section 48a to the build section 46 of the carrier element 16 only after the raw material powder has been sufficiently pre-heated to a desired pre-heating temperature by means of the first heating element 52a of the heating device 50.

Figure 3B:
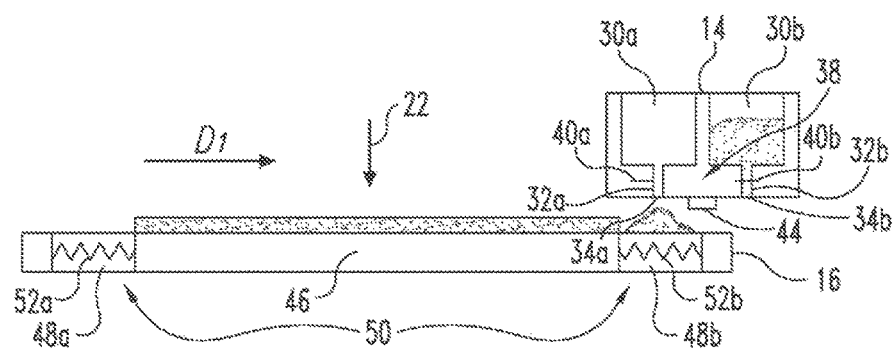
Figure 3C:
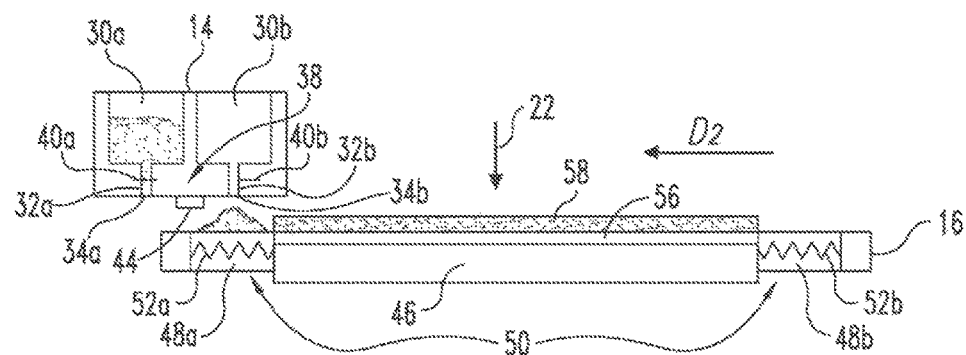

While the raw material powder layer 54 formed on the build section 46 of the carrier element 16 from the pre-heated raw material powder transferred to the build section 46 from the first transfer section 48a is selectively irradiated with electromagnetic or particle radiation, raw material powder is applied to the second transfer section 48b of the carrier element 16 by means of the powder application device 14, see FIG. 3b. In particular, raw material powder is discharged from the first powder storage 30a of the powder application device 14 via the first powder channel 32a and the first powder outlet opening 34a. Operation of the first closure element 40a, by the control unit 42, is controlled such that raw material powder is applied from the first powder storage 30a to the second transfer section 48b in an amount which corresponds to the amount of raw material powder which is necessary to form a raw material powder layer to be selectively irradiated with electromagnetic or particle radiation on the build section 46 of the carrier element 16. Hence, the amount of raw material powder applied to the second transfer section 48b again is minimized allowing a particular efficient and uniform pre-heating of the raw material powder.

The powder application device 16 remains in place, while the raw material powder applied to the second transfer section 48a, by means of the heat generated by the second heating element 52b of the heating device 50, is pre-heated to the desired temperature. Hence, the time period during which the raw material powder layer 54 generated from raw material powder transferred to the build section 46 from the first transfer section 48a is selectively irradiated with electromagnetic or particle radiation is utilized for applying further raw material powder to the second transfer section 48b and for pre-heating the further raw material powder carried by the second transfer section 48b.

When the raw material powder carried by the second transfer section 48b has reached the desired pre-heating temperature and the irradiation of the raw material powder layer transferred to the build section 46 from the first transfer section 48a is completed, the build section 46 of the carrier element 16 is lowered relative to the transfer sections 48a, 48b of the carrier element 16 so as to compensate for the height of a layer 56 of the work piece generated on the build section 46. Thereafter, the powder application device 16 is moved across the carrier element 16 in the direction D2. As a result, the slider 44 of the powder application device 16 sweeps over the raw material powder on the second transfer section 48b and transfers the raw material powder to the build section 46 of the carrier element 16. In particular, the slider 44, using the pre-heated raw material powder from the second transfer section 48b, forms a raw material powder layer 58 on the build section 46 of the carrier element 16 which again is suitable for being selectively irradiated with electromagnetic or particle radiation. The powder application device 14 thus is operated without "blank runs".

The invention claimed is:

1. A powder processing arrangement for use in an apparatus for producing three-dimensional work pieces by selectively irradiating a raw material powder with electromagnetic or particle radiation, the powder processing arrangement comprising:
  a carrier element having a build section adapted to carry a raw material powder layer while being selectively irradiated with electromagnetic or particle radiation and at least one transfer section adapted to carry the raw material powder prior to being applied to the build section so as to form the raw material powder layer to be selectively irradiated with electromagnetic or particle radiation, and
  a heating device adapted to pre-heat the raw material powder carried by the transfer section of the carrier element prior to being applied to the build section of the carrier element so as to form the raw material powder layer to be selectively irradiated with electromagnetic or particle radiation,
  a powder application device which is adapted to apply the raw material powder to the transfer section of the carrier element,
  wherein the powder application device is movable across the carrier element and is provided with a slider which allows raw material powder carried by the transfer section of the carrier element to be transferred to the build section of the carrier element and to be distributed on the build section so as to form the raw material powder layer to be selectively irradiated with electromagnetic or particle radiation on the build section by moving the powder application device across the carrier element, and
  a control unit which is adapted to control the operation of the powder application device in such a manner that the raw material powder carried by the transfer section of the carrier element is transferred to the build section of the carrier element and distributed across the build section so as to form the raw material powder layer to be selectively irradiated with electromagnetic or particle radiation on the build section only after the raw material powder, while being carried by the transfer section, has been pre-heated by the heating device.

2. The powder processing arrangement according to claim 1, wherein the heating device comprises a heating element integrated into the carrier element in the region of the transfer section of the carrier element.

3. The powder processing arrangement according to claim 1, wherein the powder application device is provided with a dosing system which allows raw material powder to be applied to the transfer section in an amount which corresponds to the amount of raw material powder which is necessary to form a raw material powder layer to be selectively irradiated with electromagnetic or particle radiation on the build section of the carrier element.

4. The powder processing arrangement according to claim 1, wherein the at least one transfer section is arranged adjacent to an edge of the build section and in particular extends along the entire length of the edge of the build section.

5. The powder processing arrangement according to claim 1, wherein the carrier element comprises a first transfer section and a second transfer section, the first transfer section being arranged adjacent to a first edge of the build section and the second transfer section being arranged adjacent to a second edge of the build section.

6. The powder processing arrangement according to claim 5, wherein the control unit is adapted to control the operation of the powder application device in such a manner that raw material powder is applied to the first transfer section of the carrier element and left on the first transfer section of the carrier element while a raw material powder layer formed on the build section of the carrier element by transferring raw material powder to the build section from the second transfer section is selectively irradiated with electromagnetic or particle radiation.

7. The powder processing arrangement according to claim 5, wherein the control unit is adapted to control the operation of the powder application device in such a manner that raw material powder is applied to the second transfer section of the carrier element and left on the second transfer section of the carrier element while a raw material powder layer formed on the build section of the carrier element by transferring raw material powder to the build section from the first transfer section is selectively irradiated with electromagnetic or particle radiation.

8. The powder processing arrangement according to claim 5,
wherein the first and the second edge of the build section extend substantially parallel to each other.

9. The powder processing arrangement according to claim 1,
wherein the carrier element comprises a first transfer section and a second transfer section, the first transfer section being arranged adjacent to a first edge of the build section and the second transfer section being arranged adjacent to a second edge of the build section; and
wherein the control unit is adapted to control the operation of the powder application device in such a manner that raw material powder is applied to the first transfer section of the carrier element and left on the first transfer section of the carrier element while a raw material powder layer formed on the build section of the carrier element by transferring raw material powder to the build section from the second transfer section is selectively irradiated with electromagnetic or particle radiation.

10. The powder processing arrangement according to claim 9,
wherein the first and the second edge of the build section extend substantially parallel to each other.

11. The powder processing arrangement according to claim 1,
wherein the carrier element comprises a first transfer section and a second transfer section, the first transfer section being arranged adjacent to a first edge of the build section and the second transfer section being arranged adjacent to a second edge of the build section; and
wherein the control unit is adapted to control the operation of the powder application device in such a manner that raw material powder is applied to the second transfer section of the carrier element and left on the second transfer section of the carrier element while a raw material powder layer formed on the build section of the carrier element by transferring raw material powder to the build section from the first transfer section is selectively irradiated with electromagnetic or particle radiation.

12. The powder processing arrangement according to claim 11,
wherein the first and the second edge of the build section extend substantially parallel to each other.

13. An apparatus for producing three-dimensional work pieces by selectively irradiating a raw material powder with electromagnetic or particle radiation, the apparatus comprising a powder processing arrangement according to claim 1.

14. The powder processing arrangement according to claim 1, wherein the control unit is adapted to control the operation of the powder application device in such a manner that raw material powder is applied to the first transfer section of the carrier element and left on the first transfer section of the carrier element while a raw material powder layer formed on the build section of the carrier element by transferring raw material powder to the build section from the second transfer section is selectively irradiated with electromagnetic or particle radiation.

15. The powder processing arrangement according to claim 1, wherein the control unit is adapted to control the operation of the powder application device in such a manner that raw material powder is applied to the second transfer section of the carrier element and left on the second transfer section of the carrier element while a raw material powder layer formed on the build section of the carrier element by transferring raw material powder to the build section from the first transfer section is selectively irradiated with electromagnetic or particle radiation.

* * * * *